(12) United States Patent
Pether

(10) Patent No.: US 7,092,035 B1
(45) Date of Patent: Aug. 15, 2006

(54) BLOCK MOVE ENGINE WITH SCALING AND/OR FILTERING FOR VIDEO OR GRAPHICS

(75) Inventor: David N. Pether, Wokingham (GB)

(73) Assignee: LSI Logic Corporation, Milpitas, CA (US)

( * ) Notice: Subject to any disclaimer, the term of this patent is extended or adjusted under 35 U.S.C. 154(b) by 594 days.

(21) Appl. No.: 09/900,940

(22) Filed: Jul. 9, 2001

(51) Int. Cl.
*H04N 9/74* (2006.01)

(52) U.S. Cl. ............................. 348/581; 345/667

(58) Field of Classification Search ............ 348/578, 348/584, 441, 581, 448, 458, 714, 716; 345/660–665, 345/671, 634, 667; 382/299, 300
See application file for complete search history.

(56) References Cited

U.S. PATENT DOCUMENTS

| | | | | |
|---|---|---|---|---|
| 4,442,544 A | * | 4/1984 | Moreland et al. | 382/273 |
| 4,872,054 A | * | 10/1989 | Gray et al. | 348/441 |
| 5,227,863 A | * | 7/1993 | Bilbrey et al. | 348/578 |
| 5,440,682 A | * | 8/1995 | Deering | 345/503 |
| 5,579,057 A | * | 11/1996 | Banker et al. | 348/589 |
| 5,594,473 A | * | 1/1997 | Miner et al. | 345/600 |
| 5,809,538 A | * | 9/1998 | Pollmann et al. | 711/151 |
| 5,903,281 A | * | 5/1999 | Chen et al. | 345/504 |
| 5,914,725 A | * | 6/1999 | MacInnis et al. | 345/441 |
| 6,189,064 B1 | * | 2/2001 | MacInnis et al. | 710/244 |
| 6,262,606 B1 | * | 7/2001 | Tamjidi | 327/108 |
| 6,301,299 B1 | * | 10/2001 | Sita et al. | 375/240.01 |
| 6,421,698 B1 | * | 7/2002 | Hong | 708/490 |
| 6,445,386 B1 | * | 9/2002 | Cook et al. | 345/419 |
| 6,466,226 B1 | * | 10/2002 | Watson et al. | 345/610 |
| 6,734,862 B1 | * | 5/2004 | Chapple et al. | 345/520 |
| 2002/0009149 A1 | * | 1/2002 | Rodriguez et al. | 375/240.25 |
| 2002/0111975 A1 | * | 8/2002 | Pether et al. | 707/530 |
| 2003/0158987 A1 | * | 8/2003 | MacInnis et al. | 710/240 |

OTHER PUBLICATIONS

"Basic Communication Theory"; J.E. Pearson; Prentice Hall (UK) Ltd, 1992; p. 84 section 6.4.3.*

* cited by examiner

*Primary Examiner*—Victor R. Kostak
(74) *Attorney, Agent, or Firm*—Christopher P. Maiorana, P.C.

(57) ABSTRACT

An apparatus comprising a first circuit and a second circuit. The first circuit may be configured to calculate and present an output signal having a first resolution in response to (i) an input signal having a second resolution and (ii) one or more control signals. The second circuit may be configured to generate the control signals in response to (i) a previous calculation by the first circuit and (ii) one or more input parameters. The first circuit may be configured to scale and filter the input signal.

19 Claims, 7 Drawing Sheets

BLOCK MOVE ENGINE WITH SCALING AND/OR FILTERING FOR VIDEO OR GRAPHICS

FIELD OF THE INVENTION

The present invention relates to a method and/or architecture for integrating video and graphics generally and, more particularly, to a block move engine with scaling and/or filtering for video and graphics conversion.

BACKGROUND OF THE INVENTION

A block move engine (BME) operates on blocks of data, which occupy rectangular regions when displayed. The block of data is read by the BME a single scan line at a time (i.e., a single dimension). To achieve 2 dimensional resizing or filtering, data is run through the BME twice, once with horizontal scanning and once with vertical scanning. The horizontal and vertical scanning can be interchanged. The results of the first pass (vertical or horizontal) are input for the second pass.

A basic scaling operation (without filtering) involves changing a number of pixels in an image by repeating or dropping pixel data in a regular pattern to obtain the required image scale factor (i.e., for 90% scaling, every 10th pixel is discarded). However visible distortions in the image appear.

SUMMARY OF THE INVENTION

The present invention concerns an apparatus comprising a first circuit and a second circuit. The first circuit may be configured to calculate and present an output signal having a first resolution in response to (i) an input signal having a second resolution and (ii) one or more control signals. The second circuit may be configured to generate the control signals in response to (i) a previous calculation by the first circuit and (ii) one or more input parameters. The first circuit may be configured to scale and filter the input signal.

The objects, features and advantages of the present invention include providing a block move engine with scaling and/or filtering for video and graphics conversion that may improve the appearance of scaled images.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
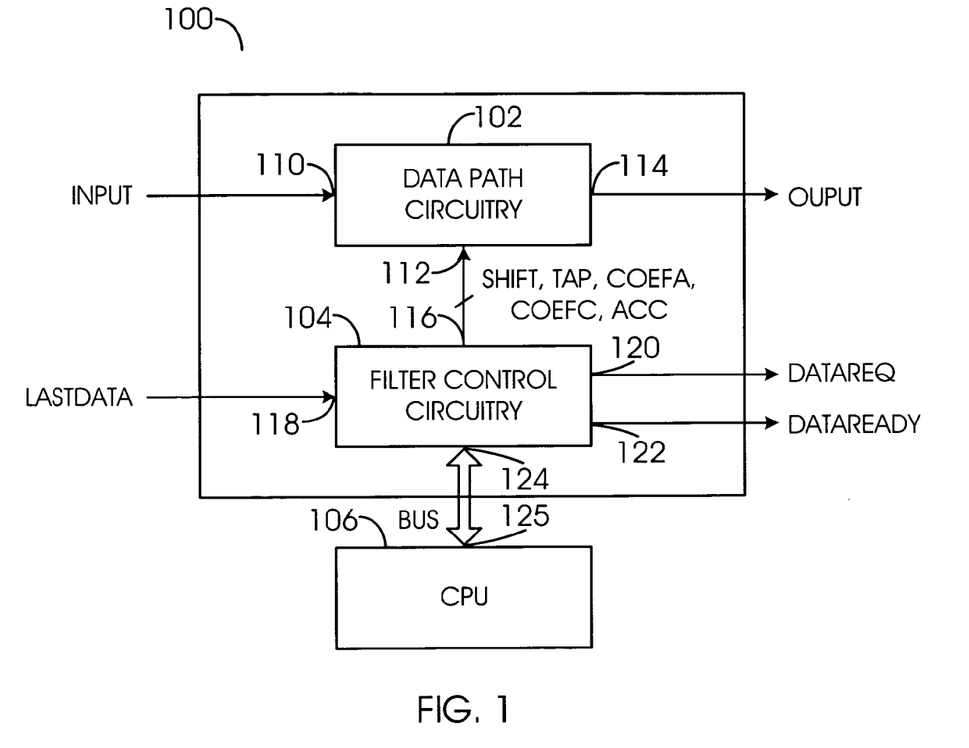
FIG. 1 is a block diagram of a preferred embodiment of the present invention.

Referring to FIG. 1, a block diagram of a circuit 100 is shown in accordance with a preferred embodiment of the present invention. The circuit 100 may implement scaling and filtering of data to improve the appearance of scaled images. The circuit 100 generally comprises a circuit 102, a circuit 104 and a circuit 106. The circuit 102 may be implemented, in one example, as a data path circuit. The circuit 104 may be implemented, in one example, as a filter control circuit. The circuit 106 may be implemented, in one example, as a CPU, microprocessor, or other appropriate processor. The circuit 102 may have an input 110 that may receive a signal (e.g., INPUT), an input 112 that may receive one or more control signals, and an output 114 that may present a signal (e.g., OUTPUT). The filter control circuit 104 may have an output 116 that may present the control signals to the input 112. The filter control circuit 104 may also have an input 118 that may receive a signal (e.g., LASTDATA), an output 120 that may present a signal (e.g., DATAREQ), an output 122 that may present a signal (e.g., DATAREADY), and an input/output 124 that may receive signals (e.g., BUS) from an input/output 125 of the CPU 106.

Figures 2, 2B:
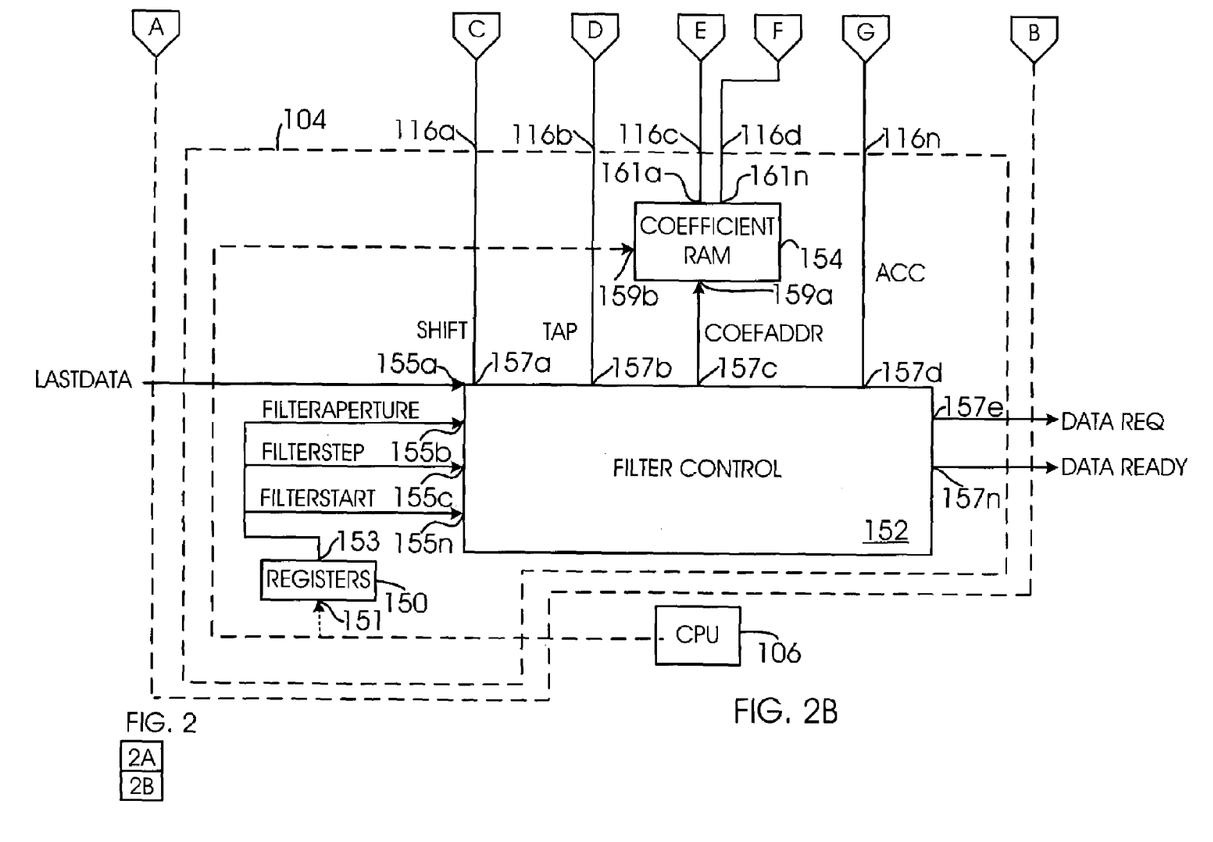
FIGS. 2A and 2B are a detailed block diagram of a preferred embodiment of the circuit of FIG. 1.
Figure 2A:
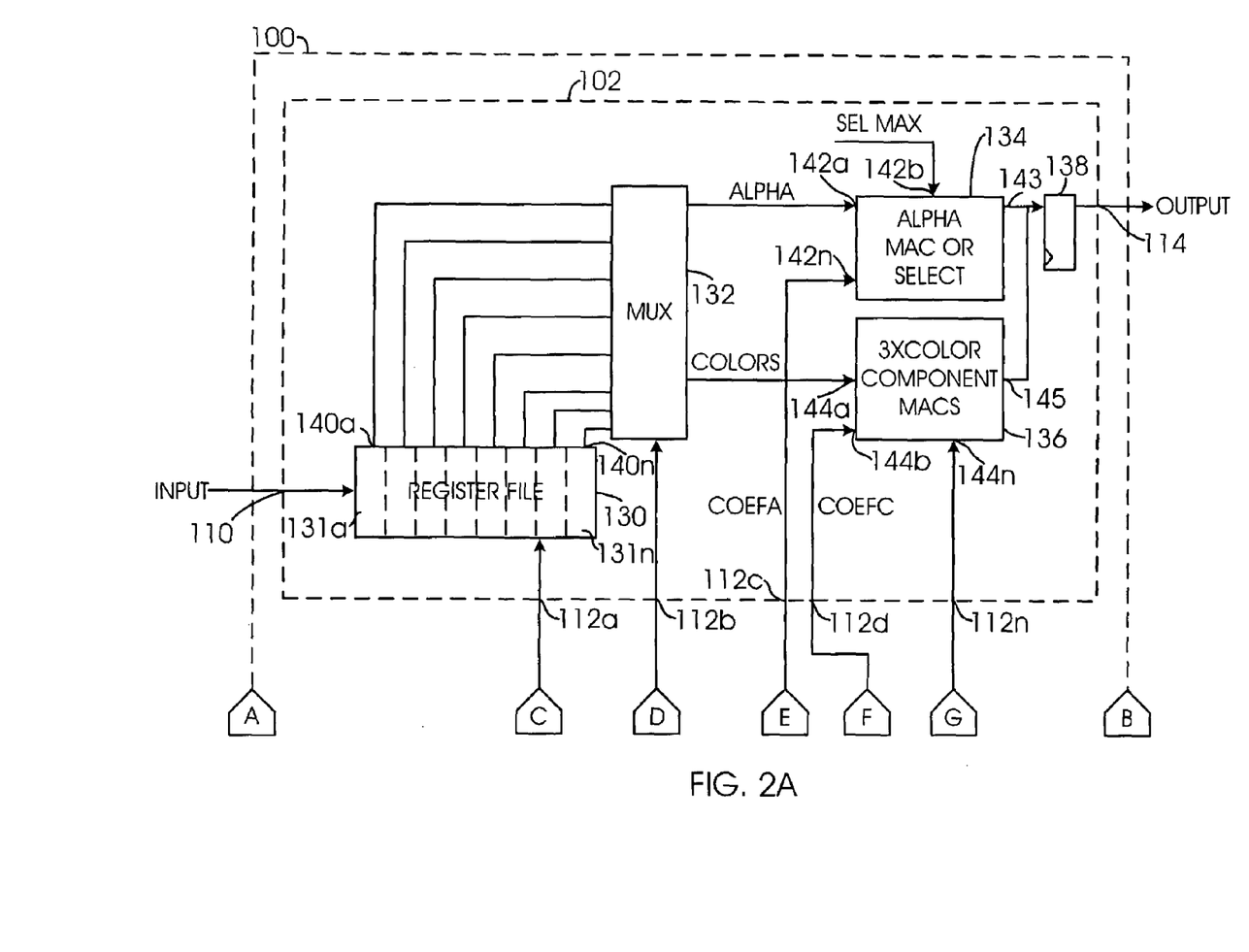

Referring to FIGS. 2A and 2B, a detailed block diagram of the data path circuit 102 and the filter control circuit 104 is shown. The data path circuit 102 generally comprises a register 130, a multiplexer 132, a circuit 134, a circuit 136, and a circuit 138. The circuit 130 may be implemented as a register file. The register file 130 may comprise a number of register sets 131a–131n. The circuit 134 may be implemented as an alpha multiplier and accumulator (MAC) or a select circuit. The circuit 136 may be implemented as color component MACs. In one example, a circuit 136 may be implemented as a 3× color component MACs.

The register file 130 may have a number of outputs 140a–140n that may be presented to the multiplexer 132. The multiplexer 132 may present a signal (e.g., ALPHA) to an input 142a of the circuit 134 and a signal (e.g., COLORS) to an input 144a of the circuit 136. The alpha MAC or select circuit 134 may have an input 142b that may receive a signal (e.g., SELMAX) and an input 142n that may receive a signal (e.g., COEFA). The circuit 134 may also have an output 143 that may present a signal to the circuit 138. The circuit 136 may have an input 144b that may receive a signal (e.g., COEFC) and an input 144n that may receive a signal (e.g., ACC). The circuit 136 may also have an output 145 that may present a signal to the circuit 138. In one example, the circuit 138 may be implemented as a memory element. The memory element 138 may present the signal OUTPUT.

The circuit 104 generally comprises a circuit 150, a circuit 152 and a circuit 154. The circuit 150 may be implemented as a register circuit. The circuit 152 may be implemented as a filter control circuit. The circuit 154 may be implemented as a coefficient RAM circuit. The register 150 may have an input 151 that may receive control signals from the CPU 106.

The register 150 may also have an output 153 that may present a number of signals (e.g., FILTERAPERTURE, FILTERSTEP and FILTERSTART). The filter control circuit 152 may have an input 155a that may receive the signal LASTDATA, an input 155b that may receive the signal FILTERAPERTURE, an input 155c that may receive the signal FILTERSTEP and an input 155n that may receive the signal FILTERSTART. The filter control circuit 152 may also have an output 157a that may present a signal (e.g., SHIFT), an output 157b that may present a signal (e.g., TAP), an output 157c that may present a signal (e.g., COEFADDR), an output 157d that may present the signal ACC, an output 157e that may present the signal DATAREQ and an output 157n that may present the signal DATAREADY. The signals DATAREQ and DATAREADY may be implemented for asynchronous transfer. The coefficient RAM 154 may have an input 154a that may receive the signal COEFADDR and an input 154b that may receive control signals from the CPU 106. The coefficient RAM 154 may have an output 161a that may present the signal COEFA and an output 161b that may present the signal COEFB. The coefficient RAM 154 may generate the signals COEFA and COEFC in response to the CPU 106 and the signal COEFADDR.

Figure 3:
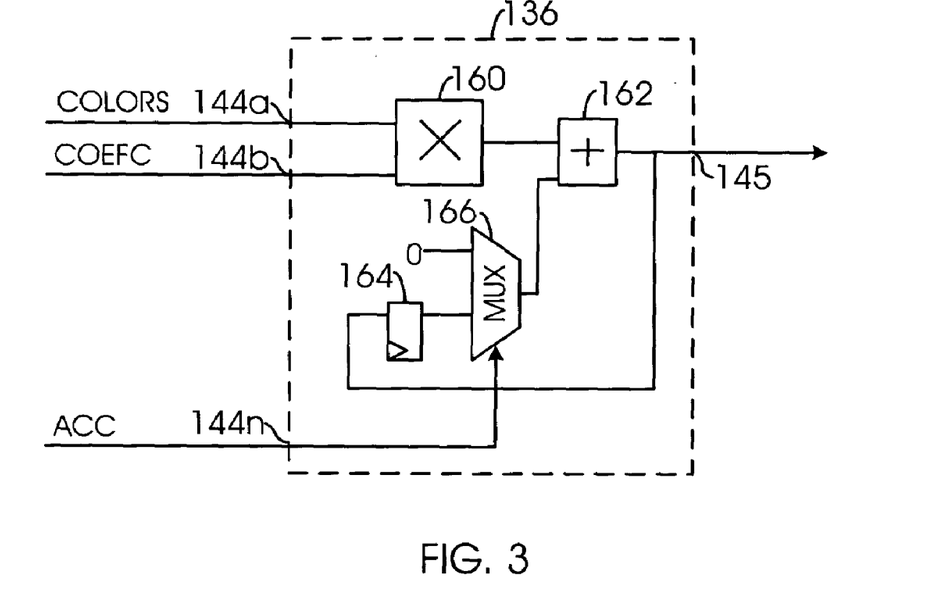
FIG. 3 is a block diagram of a color component MAC circuit of the circuit of FIG. 1.

Referring to FIG. 3, a more detailed diagram of the circuit 136 is shown. The circuit 136 generally comprises a circuit 160, a circuit 162, a circuit 164 and a circuit 166. The circuit 160 may be implemented, in one example, as a multiplication circuit. The 162 may be implemented, in one example, as an adder circuit. The circuit 164 may be implemented, in one example, as a register circuit. The circuit 166 may be implemented, in one example, as a multiplexer circuit.

The multiplication circuit 160 may receive the signal COLORS from the input 144a and the signal COEFC from the input 144b and present a signal to the adder 162. The multiplexer 166 may have a first input that may receive a ground reference voltage, a second input that may receive an output of the register 164 and a select input that may receive the signal ACC from the input 144n. The multiplexer 166 may present an output to the adder 162. The adder 162 may present an output signal that may be presented to the output 145.

Figure 4:
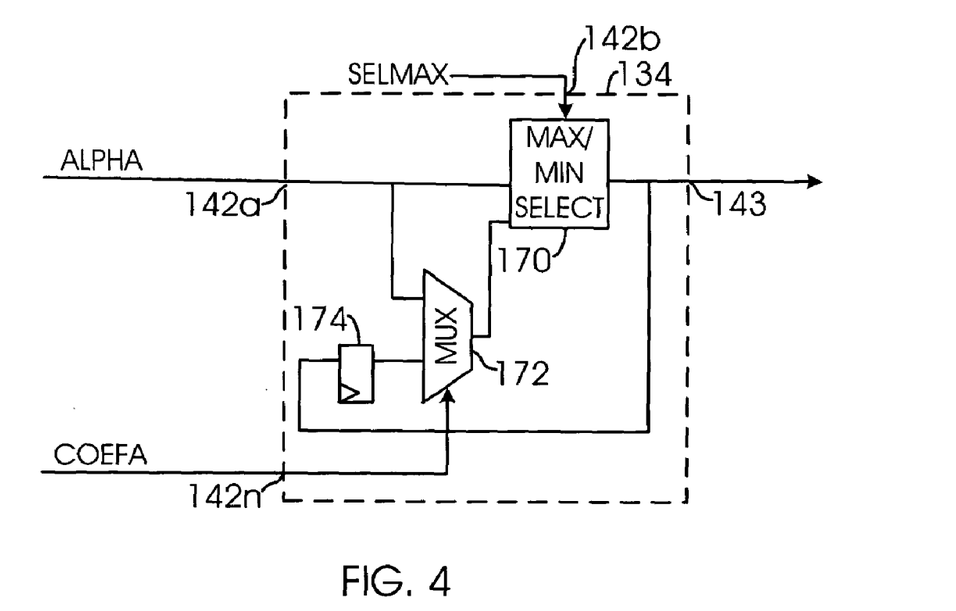
FIG. 4 is a block diagram of an alpha select circuit of the circuit of FIG. 1.

Referring to FIG. 4, a more detailed diagram of the circuit 134 is shown. The circuit 134 generally comprises a circuit 170, a circuit 172, and a circuit 174. The circuit 170 may be implemented, in one example, as a max/min select circuit. The circuit 174 may be implemented, in one example, as a multiplexer circuit. The circuit 174 may be implemented, in one example, as a register circuit.

The max/min select 170 may receive the signal ALPHA from the input 142a and the signal SELMAX from the input 142b. The max/min select 170 may also receive an output of the multiplexer 172. The multiplexer 172 may have a first input that may receive the signal ALPHA, a second input that may receive an output of the register 174 and a select input that may receive the signal COEFA from the input 142n. The max/min select 170 may also present an output that may be presented to the output 143 and to the register 174.

Figure 5:
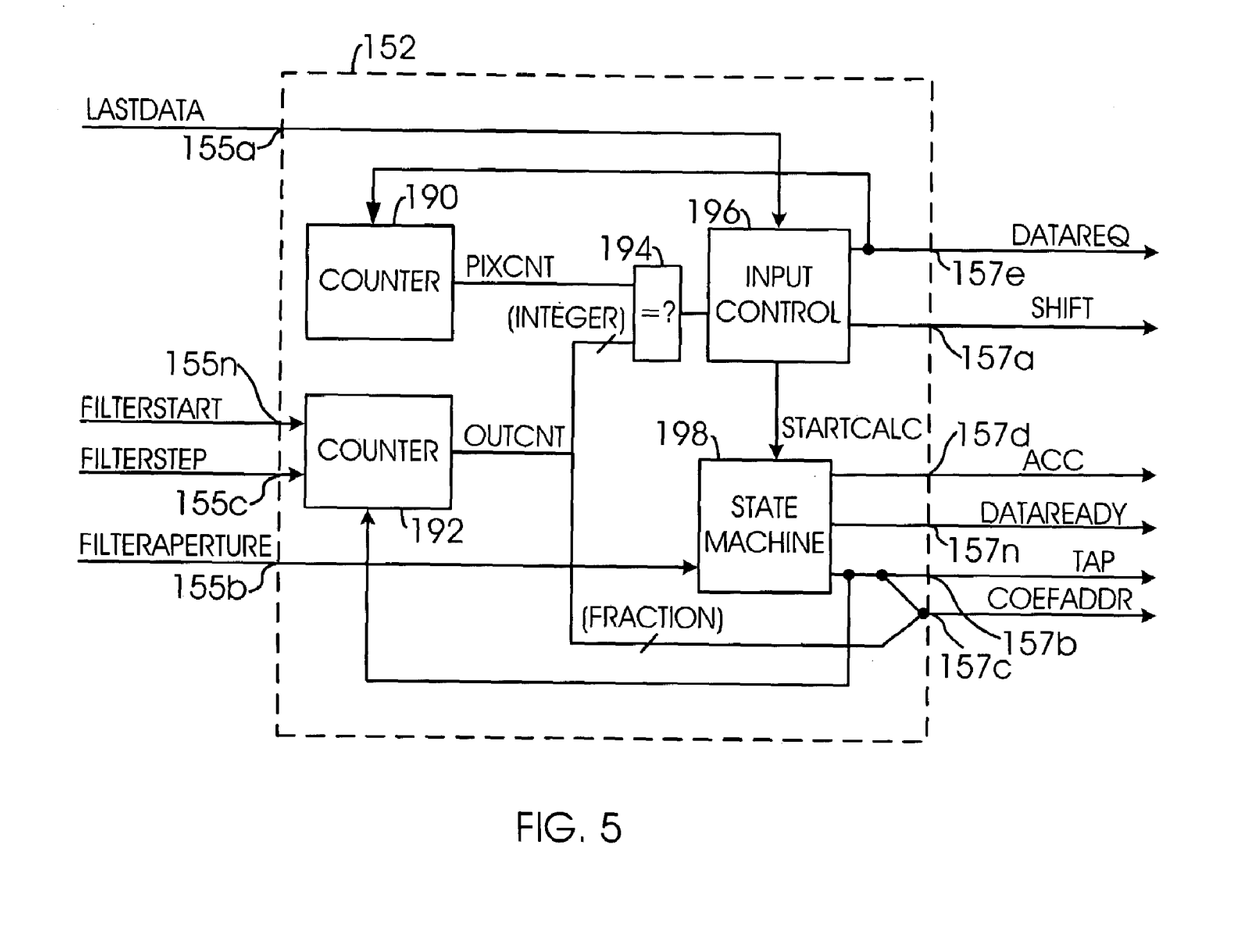
FIG. 5 is a block diagram of a filter control circuit of the circuit of FIG. 1.

Referring to FIG. 5, a more detailed diagram of the filter circuit 152 is shown. The circuit 152 generally comprises a circuit 190, a circuit 192, a circuit 194, a circuit 196, and a circuit 198. The circuits 190 and 192 may be implemented as counter circuits. The circuit 194 may be implemented as a compare circuit. The circuit 196 may be implemented as a control circuit. The circuit 198 may be implemented as a state machine.

The counter 190 may receive a feedback of the signal DATAREQ and generate a signal (e.g., PIXCNT). The counter 192 may receive the signals FILTERSTART, FILTERSTEP, and a feedback of the signal DATAREADY. The counter 192 may generate a signal (e.g., OUTCNT). An integer portion of the signal OUTCNT and the signal PIXCNT may be presented to the compare circuit 194. An output of the compare circuit 194 may be presented to the input control circuit 196. The input control circuit 196 may also receive the signal LASTDATA, present the signal DATAREQ, the signal SHIFT and a signal (e.g., STARTCALC). The signal STARTCALC may be presented to the state machine 198. The state machine 198 may also receive the signal FILTERAPERATURE from the input 155b. The state machine 198 may be configured to generate the signals ACC, DATAREADY and TAP. A portion of the signal OUTCNT and the signal TAP may be combined to form the signal COEFADDR.

In one example, the circuit 100 may be implemented as part of a block move engine (BME). The circuit 100 may be utilized to operate on blocks of data which occupy rectangular regions when displayed. Typically, a block of data is read by the circuit 100 a single line (e.g., a scan line) at a time. Moreover, scan lines may be vertical or horizontal. Once a scan line has been read, processed and written back to memory (not shown), the circuit 100 may then process a next scan line. By adding the ability to filter data, (which allows a number of input pixels to contribute to the creation of each output pixel), improvements to the appearance of scaled images may be gained.

The circuit 100 may scale alpha data which may be associated with an image, because the pixel data may optionally include an alpha component per pixel. An alpha component is a transparency component, often implemented for each pixel. For example, an alpha component value of 128 may indicate the pixel is generally completely opaque. An alpha component value of 0 may indicate the pixel is generally completely transparent. Values between 0 and 128 generally indicate a percentage of opaqueness. However, other conventions may be implemented accordingly to meet the design criteria of a particular implementation. The circuit 134 may reduce the spreading effect of filtered alpha data. Typically, spreading effects are regions which were transparent and become slightly opaque, with unpredictable results.

The signal INPUT may represent input data that is generally presented one pixel at a time when the request signal DATAREQ is active. The pixel data may be received in a variety of YUV, red-green-blue (RGB), or other appropriate type encoding formats, with all three color components being present simultaneously.

When an output pixel is calculated, it is stored in the output register 138 such that the signal DATAREADY is set active to signal that the data can be used by the next processing stage of the circuit 100. The circuit 100 may receive the signal LASTDATA which is active when the last pixel data for each scan line is present on the signal INPUT. The signal LASTDATA generally indicates when the filter 152 may reset in preparation for a new line of pixel data (although processing of a current scan line may complete first).

The three generic flow control signals (e.g., the signals DATAREQ, DATAREADY, and LASTDATA) may be implemented to ensure that the scale and filter block 152 interfaces correctly with surrounding components of the circuit 100. The signals DATAREQ, DATAREADY and LASTDATA may be dependent on particular implementation or application.

The main (or graphics) CPU 106 may be external to the circuit 100 and may communicate with the BME via the system bus BUS. The CPU 106 may set up the BME control registers 150, (which may determine the operation performed by the scale and filter block 152) and the contents of the coefficient RAM 154 (which may need to be changed between different filtering operations). For example, the signal FILTERAPERATURE may set a size of a filter aperture (of the filter control 132) to be used (assuming the filter aperture is variable), the signal FILTERSTEP may set a linear scaling ratio, and the signal FILTERSTART may set a first output pixel position relative to the input data.

The register file 130 may store a series of pixels simultaneously. The length of the register file 130 may be the same as the largest filter aperture implemented and as wide as the largest pixel depth (e.g., 32-bits). However, other depths/widths of the register file 130 may be implemented accordingly to meet the design criteria of a particular implementation. The register file 130 may be implemented as a delay element of the circuit 100. For example, as each pixel arrives on the signal INPUT (under control of the signal DATAREQ), a new pixel may be shifted into the first register set of the register file 130. The data presently in the register file 130 is generally then shifted one position by the signal SHIFT. The data in the last register set of the register file 130 may then be discarded.

Special cases may occur at the start and end of the scan lines, dependent upon a particular application. For example, at the start of a new line of input data (e.g., after the signal LASTDATA has been active), the first pixel value may be copied throughout the entire register file 130 by multiple pulses of the signal SHIFT for a single pulse of the signal DATAREQ. In such a case, the register file 130 may be full of valid data before any processing starts. Additionally, the register file 130 may prevent incorrect output data from being generated using the input data from the end of the previous line when the first output point is not within the input data block.

At the end of the line (e.g., after the signal LASTDATA becomes active), if any further output points are required for the line, the DATAREQ signal is suppressed such that the register file 130 may fill with repeated copies of the last data value for the line. Any remaining output points may continue to be generated using the data in the file. Therefore, the register file 130 may not produce new pixels at the end of the line based on the data for the start of the next line.

The multiplexer 132 may select the pixel data from the register set 131a–131n in the register file 130 under the control of the signal TAP. Each register set 131a–131n may contain data for one pixel, which may have three color components (YUV or RGB) and optionally an alpha component.

The contents of the coefficient RAM 154 may be set up by the CPU 106. Alternatively, for applications of a small number of variants of data and filter types, a dedicated read only memory (ROM) may be implemented. The coefficient RAM 154 may then contain a series of coefficient sets for a particular filtering process required. The coefficients may change with appropriate scaling factors. Additionally, separate filter coefficients for color and alpha components (e.g., the circuit 134 and the circuit 136) may be implemented if the alpha component is to be filtered differently.

The filter control circuit 152 may generate the signal COEFADDR. The signal COEFADDR may be the read address for the coefficient RAM 154. The signal COEFADDR may depend on the signal TAP of the filter OUTPUT currently being calculated and the position of the output pixel relative to the input pixel data INPUT.

The circuit 136 may be implemented as color component MACs. The treatment of each of the three color components may be substantially identical. In one example, the circuit 136 may be implemented as multiply-accumulate circuit for one component. For a single pixel output value, the input pixels (COLORS) from each stage 131a–131n in the register file 130 are accessed in turn by the signal TAP and the appropriate coefficients COEFC may then be selected by the signal COEFADDR. Each data-coefficient pair is multiplied together and the result added to the value in the accumulate register 138. For the first value, the signal ACC is inactive, thus, the signal ACCREG may be forced to 0, effectively clearing the accumulator 138 at the start of an output pixel calculation. For the remaining parts of the calculation the signal ACC may be active, such that the signal OUTPUT of the accumulation register 138 may appear on ACCREG. Therefore, the filtered value which makes up the output pixel OUTPUT is constructed by the signal TAP.

The alpha MAC or select circuit 134 may allow the alpha channel to implement substantially identical MAC circuitry to the color channel circuit 136. Alternately, the select circuit of FIG. 4 could be implemented. The coefficient RAM storage 154 may allow the channel to implement different coefficients. Alternatively, a form of maximum or minimum value selection to prevent undesirable spreading of alpha transparency into regions where visible errors occurs may be implemented. The technique may be referred to as non-additive mixing (NAM).

Each value ALPHA coming from the register file 130 may be compared with the value stored in the register 138. The larger or smaller of the values (determined by the state of the signal SELMAX) may then passed to the output of the max/min select block 170 and can be stored in the register 138. Thus the final result (e.g., the signal OUTPUT) is either the largest or the smallest of the values in the register file 130 at the time. The signal ACC may be used to override the first decision for an output pixel calculation. The first alpha value ALPHA may be compared with itself, and placed in the register 138 by default. The signal SELMAX may be implemented as a control signal from the CPU 106 via control register (not shown). The setting of the signal SELMAX may depend on whether alpha transparency is coded with high or low alpha values.

The filter control 152 may contain two main counters, the pixel counter 190 which may count the input pixels loaded into the register file 130 for each line and the output counter 192 which may be loaded with a starting position value of the signal FILTERSTART at the beginning of every scan line, and incremented by the scale-factor-determining value FILTERSTEP after the calculation of every output pixel point. The signal FILTERSTEP may contain the number of input pixels which may fall between any consecutive two output pixels, and may thus be considered to be a number with an integer and a fractional part (e.g., if the output scaling was 80% relative to the input, then FILTERSTEP may be 1.25 as each output pixel step would encompass 1.25 input pixels).

Input data is requested, using the signal DATAREQ, until the value (or signal) PIXCNT is substantially identical to the "integer part" of the value (or signal) OUTCNT. When the values are substantially identical, it is possible to calculate an output pixel, so the signal STARTCALC is activated. The fractional part of the value OUTCNT may be used (together with the signal TAP) in the generation of the signal COEFADDR to select the correct coefficients for the required pixel output position. Once the output value has been calculated, the output counter 192 may be increased by an amount FILTERSTEP. The process may continue for valid input data.

The state machine 198 may count through each of the taps and their associated coefficients and control the accumulation of the result. If the required aperture, controlled by the signal FILTERAPERATURE, is not the full length of the register file 130 then the number of states visited by the state machine 148 may be modified such that unnecessary calculations are not performed.

Figure 6A:
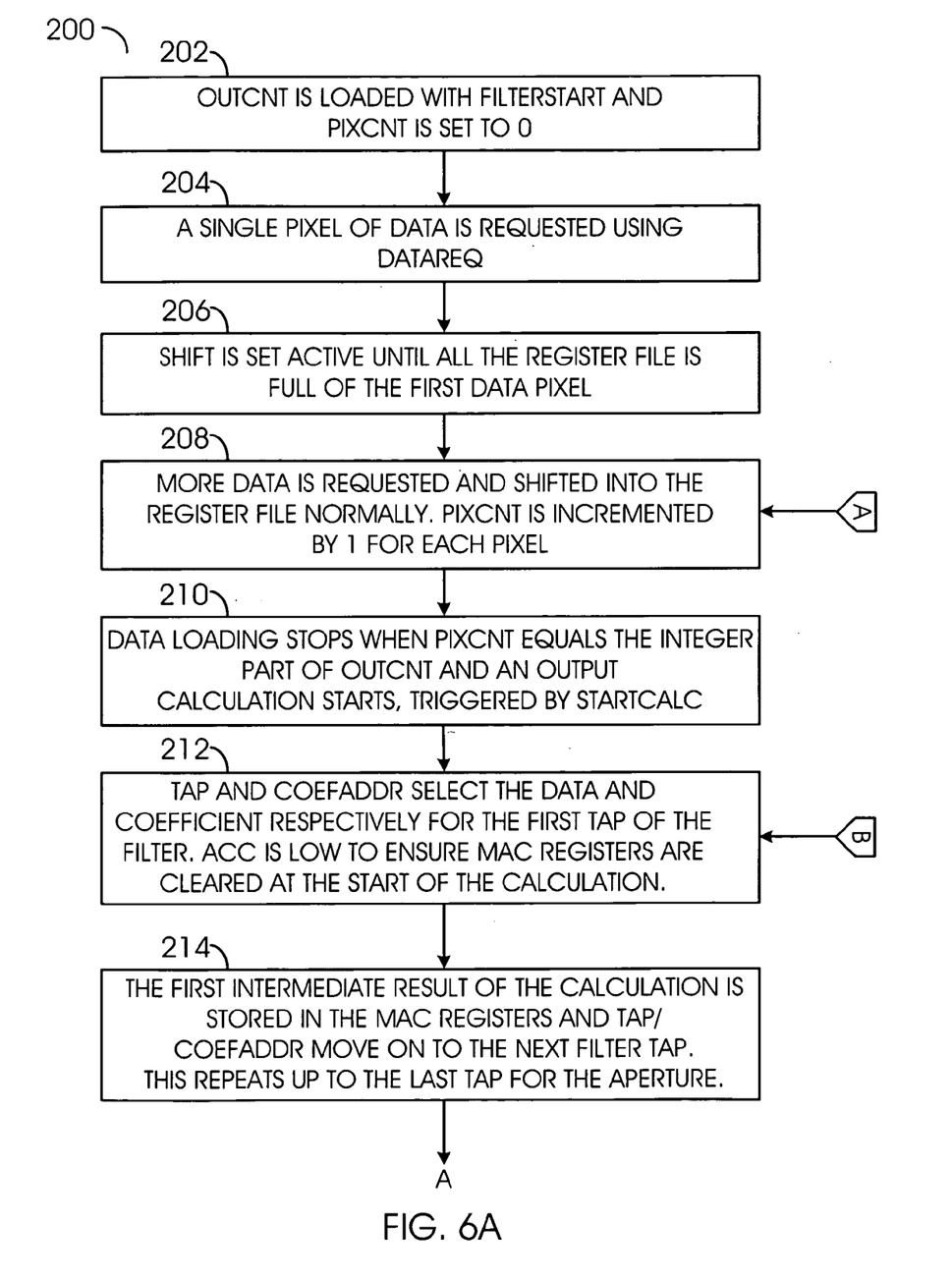
FIGS. 6A and 6B show a method illustrating a sequence of operations for each BME scan line.
Figure 6B:
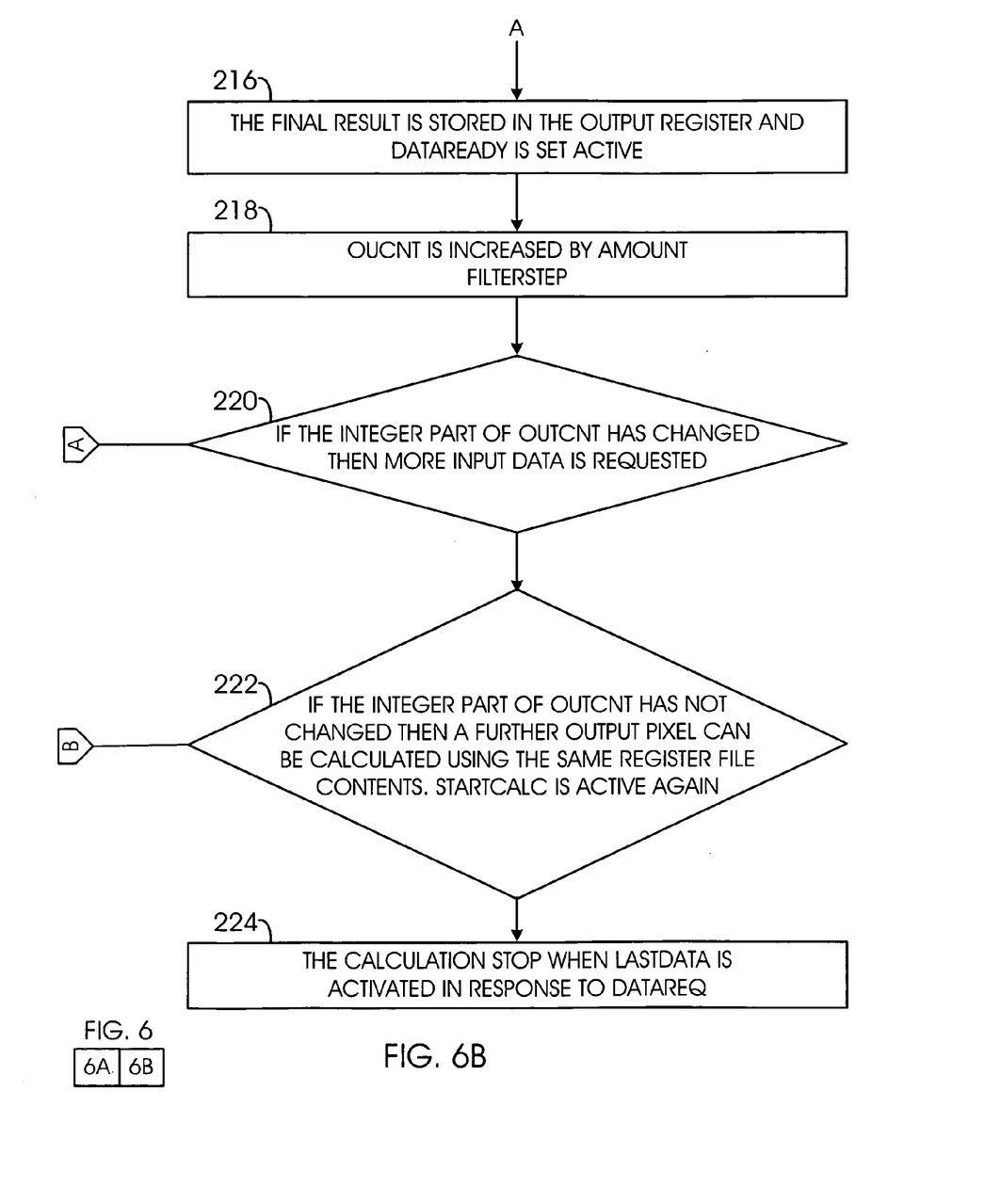

Referring to FIGS. 6A and 6B, a method 200 illustrating a sequence of operations for each BME scan line is shown. At a state 202, the output counter 192 may be loaded with data from the signal FILTERSTART, and the pixel counter 190 (or the signal PIXCNT) may be set to 0. At a state 204, a single pixel of data may requested by the signal DATAREG. At a state 206, a shift is set active until all the register file 130 is full of the first data pixel. At a state 208, additional data may then be requested and shifted into the register file 130 normally. The pixel counter 190 (or the signal PIXCNT) may be incremented by 1 for each input pixel. At a state 210, data loading may stop when the signal PIXCNT equals the integer part of the signal OUTCNT. Therefore, an output calculation may start, triggered by the signal STARTCALC. At a state 212, the signals TAP and COEFADDR select the data and coefficient respectively for the first tap of the filter 100. The signal ACC may be low to ensure MAC register 136 is cleared at the start of the calculation.

At a state 214, the first intermediate result of the calculation may be stored in the MAC registers and the signals TAP/COEFADDR move on to the next filter tap. The process may repeat up to the last tap for the aperture. At a state 216, the final result is stored in the output register 138 and the signal DATAREADY is set active. At a state 218, the signal OUTCNT may then be increased by the amount FILTERSTEP. At a decision state 220, if the integer part of the signal OUTCNT has changed then more input data is requested returning to the state 208. At a decision state 222, if the integer part of the signal OUTCNT has not changed then a further output pixel may be calculated using the same register file contents. The signal STARTCALC may be active again and the method 200 may proceed to the state 212. At a state 224, the calculation may stop when LAST-DATA is activated in response to the signal DATAREQ.

The filter control 152 may be combined within a design and the method most appropriate for a particular situation selected by the CPU 106. The implementation of the filter 152 may depend upon a particular implementation. For example, a single multiplier shared between color components may be implemented. Such a case may require more multiplexing to select every component value for every pixel in turn, and may also require longer to complete the calculation for a given aperture. Also, separate multipliers may be implemented for each tap, requiring no multiplexing or accumulation registers. Each result may then be generated in a single cycle, to provide the highest-performance solution at the cost of a large number of multiplexers and adders. The pixel depths and resolution of coefficients may determine the size of multipliers required. The pixel depths and resolution along with the desired processing performance and space/power available for the design may inform the choice of the best method to use. The present invention may provide a scale and filter block within BME.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to calculate and present an output signal having a first resolution and a plurality of output pixels in response to (i) an input signal having a second resolution and a plurality of input pixels and (ii) one or more control signals, wherein said input signal is stored in a register file a scan line at a time in response to a data request signal; and
a second circuit configured to generate said control signals in response to (i) a previous calculation by said first circuit and (ii) one or more input parameters, wherein (a) said first circuit is configured to scale and filter said input signal to allow one or more of said input pixels to contribute to the creation of one or more of said output pixels, (b) said apparatus comprises a portion of a block move engine (BME), and (c) said second circuit comprises a coefficient RAM circuit configured to provide (i) a color coefficient for an input color pixel and (ii) an alpha coefficient for an input alpha pixel.

2. The apparatus according to claim 1, wherein said first circuit further comprises a multiplexer configured to generate said output signal by selecting said plurality of input pixels from said register file in response to said one or more control signals.

3. The apparatus according to claim 2, wherein said register file comprises a plurality of register sets configured to provide said plurality of input pixels to said multiplexer.

4. The apparatus according to claim 1, wherein said first circuit independently calculates a horizontal component and a vertical component of said output signal.

5. The apparatus according to claim 1, wherein said apparatus is configured to operate on one or more blocks of data.

6. The apparatus according to claim 1, wherein said apparatus is configured to (i) process said scan line, (ii) write said scan line back to a memory and (iii) process a next scan line.

7. The apparatus according to claim 1, wherein said apparatus is configured to allow two or more of said input pixels to contribute to the creation of one or more of said output pixels.

8. The apparatus according to claim 1, wherein said apparatus is configured to scale alpha data associated with an image.

9. The apparatus according to claim 1, further comprising: a microprocessor coupled to said second circuit through a bus.

10. The apparatus according to claim 1, wherein said second circuit comprises a color multiplier and accumulator (MAC) configured to (i) multiply said color coefficient to said input color pixel and (ii) produce a first result.

11. The apparatus according to claim 10, wherein said second circuit comprises an alpha MAC configured to (i) multiply said alpha coefficient to said input alpha pixel and (ii) produce a second result.

12. A method for scaling and filtering of video, comprising the steps of:
(A) calculating an output signal having a first resolution and a plurality of output pixels in response to (i) an input signal having a second resolution and a plurality of input pixels and (ii) one or more control signals, wherein said input signal is stored in a register file a scan line at a time in response to a data request signal;
(B) generating said control signals in response to (i) a previous calculation by step (A) and (ii) one or more input parameters;
(C) scaling and filtering said input signal to allow one or more of said input pixels to contribute to the creation of one or more of said output pixels, wherein the method is implemented in a block move engine (BME); and (D) generating said control signals and said data request signal in response to one or more filter control signals wherein said filter control signals provides (i) the size of a filter aperture, (ii) a linear scaling ratio and (iii) a first output pixel position relative to input data.

13. The method according to claim 12, wherein step (A) further comprises the step of:
selecting said plurality of input pixels from said register file in response to one or more control signals.

14. The method according to claim 12, wherein step (B) further comprises:
generating said control signals and said data request signal in response to one or more filter control signals wherein said filter control signals provides (i) the size of a filter aperture, (ii) a linear scaling ratio and (iii) a first output pixel position relative to input data.

15. The method according to claim 12, further comprising the step of:
operating on one or more blocks of data.

16. The method according to claim 12, further comprising the step of:
reading a block of data a scan line at a time.

17. The method according to claim 12, further comprising the step of:
allowing one or more input pixels to contribute to the creation of two or more output pixels.

18. An apparatus comprising:
a first circuit configured to calculate and present an output signal having a first resolution and a plurality of output pixels in response to (i) an input signal having a second resolution and a plurality of input pixels and (ii) one or more control signals, wherein said input signal is stored in a register file a scan line at a time in response to a data request signal; and
a second circuit configured to generate said control signals in response to (i) a previous calculation by said first circuit and (ii) one or more input parameters, wherein (a) said first circuit is configured to scale and filter said input signal to allow one or more of said input pixels to contribute to the creation of one or more of said output pixels, (b) said apparatus comprises a portion of a block move engine (BME), and (c) said second circuit comprises an output register configured to (i) store a final output between the summation of a first result and value and (ii) store a final output between the summation of a second result and value.

19. An apparatus comprising:
a first circuit configured to calculate and present an output signal having a first resolution and a plurality of output pixels in response to (i) an input signal having a second resolution and a plurality of input pixels and (ii) one or more control signals, wherein said input signal is stored in a register file a scan line at a time in response to a data request signal; and
a second circuit configured to generate said control signals in response to (i) a previous calculation by said first circuit and (ii) one or more input parameters, wherein (a) said first circuit is configured to scale and filter said input signal to allow one or more of said input pixels to contribute to the creation of one or more of said output pixels, (b) said apparatus comprises a portion of a block move engine (BME), (c) said second circuit comprises a filter control circuit configured to generate said one or more control signals and said data request signal in response to one or more filter control signals, and (d) said filter control signals provide (i) the size of a filter aperture, (ii) a linear scaling ratio, and (iii) a first output pixel position relative to input data.

* * * * *